United States Patent [19]

Zang et al.

[11] 4,222,693

[45] Sep. 16, 1980

[54] PRECISION DRAFTING INSTRUMENT

[75] Inventors: Eugene E. Zang, Centreville, Va.; Joe S. Sheck, Gaithersburg, Md.; Clifford A. Calhoun, Fairfax, Va.

[73] Assignee: The United States of America as represented by the Secretary of the Interior, Washington, D.C.

[21] Appl. No.: 969,047

[22] Filed: Dec. 13, 1978

[51] Int. Cl.[3] .......................... B23B 45/02; B23C 1/20

[52] U.S. Cl. .......................................... 409/175; 408/9; 408/14; 408/112; 409/134; 409/184

[58] Field of Search ............... 409/134, 175, 178, 181, 409/182, 184, 185, 186, 193; 408/9, 14, 112, 124

[56] References Cited

U.S. PATENT DOCUMENTS

| | | | |
|---|---|---|---|
| 1,148,397 | 7/1915 | Nelson | 409/134 |
| 2,399,707 | 5/1946 | Salvatore | 409/134 |
| 2,415,545 | 2/1947 | Widlarz | 408/9 |
| 2,958,131 | 11/1960 | Keene | 409/178 |
| 3,246,546 | 4/1966 | Madden | 408/9 |
| 3,899,264 | 8/1975 | Tobias | 408/14 |
| 3,935,909 | 2/1976 | Mabuchi et al. | 408/124 X |

*Primary Examiner*—Z. R. Bilinsky

*Attorney, Agent, or Firm*—Gersten Sadowsky; Donald A. Gardiner

[57] ABSTRACT

An improved drafting instrument is provided for scribing small dots on a drafting medium comprising a substrate provided with a removable surface coating. The drafting instrument includes a drive motor and rotatable cutter which are slidably mounted as a unit for vertical movement toward and away from the drafting medium. A manually operable actuator is provided for moving the drive motor downward to bring the cutter into engagement with the surface coating of the drafting medium. A control switch responds to downward movement of the drive motor and cutter by a predetermined distance for automatically actuating the drive motor before the cutter is moved into engagement with the drafting medium. The drafting instrument includes an adjustable depth limit feature to control the depth of penetration of the cutter into the surface coating of the drafting medium. The operation of the drive motor and rotation of the cutter are automatically terminated when manual pressure on the actuator is released.

4 Claims, 6 Drawing Figures

Fig. 3
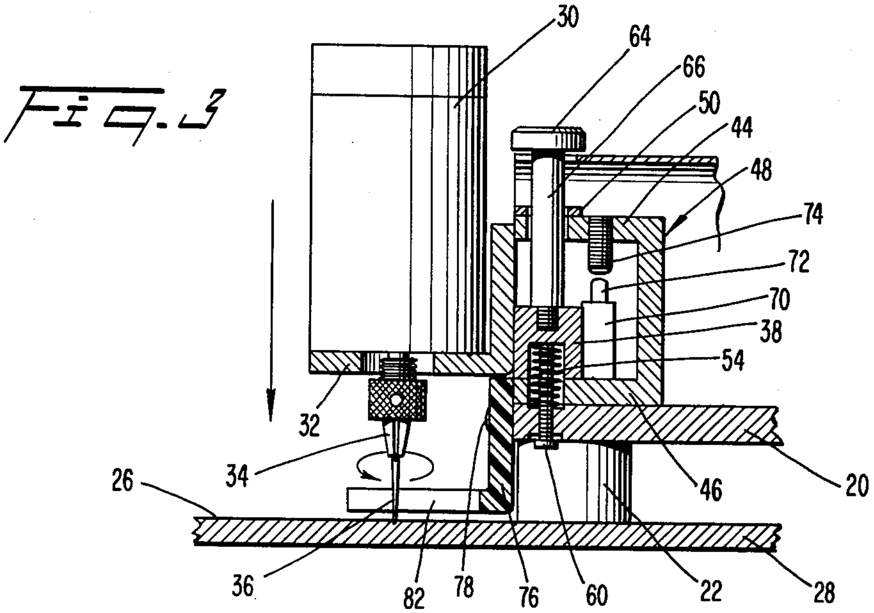
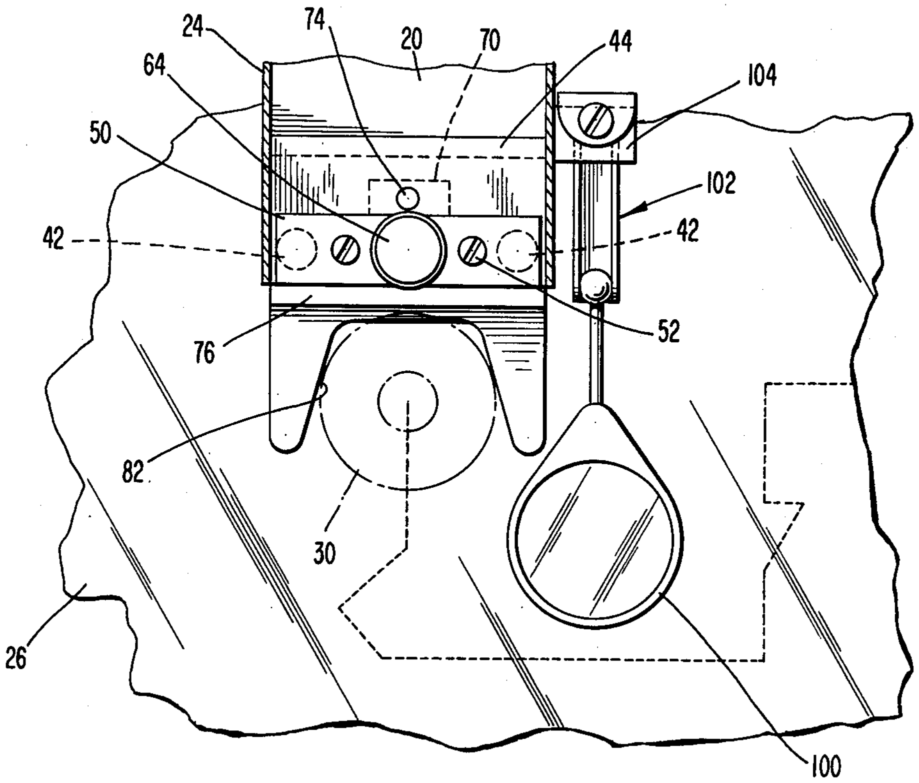
Fig. 4

PRECISION DRAFTING INSTRUMENT

TECHNICAL FIELD

The present invention relates to a drafting instrument for scribing dots on a drafting medium, and more particularly, to a precision drafting instrument for scribing small dots on a drafting medium comprising a substrate provided with a removable surface coating. The instrument is especially suitable for use with such drafting media to mechanically produce a photographic negative which can be used to reproduce maps and technical drawings.

BACKGROUND ART

In the graphic arts, scribing is an improved drafting technique in which specially coated films are scribed by using sharp cutting tools to form desired lines, letters, numbers, and other symbols, in a thin surface coating on the drafting film. For example, a drafting film known as Scribe Coat TM manufactured by Keuffel & Esser Co., comprises a dimensionally stable polyester plastic film, approximately 0.0050 inch to 0.0075 inch in thickness, which is roller coated with actinically opaque paint. Drafting on this material is accomplished with various tools equipped with either phonograph needles, sapphire cutters or cutting blades. By removing the painted surface with these tools to form lines, letters, numbers and other symbols, a mechanical photographic negative is produced. This type of negative can be used directly to reproduce maps and other technical drawings by photolithographic techniques.

To form dots on such scribe films, drill-like drafting instruments commonly known as "dotters" have been developed in the prior art. Such instruments generally include a small electric motor coupled by a pulley drive arrangement to a rotatable chuck for holding a rotary cutting element. Typically, a manually operable control switch or toggle switch is provided to actuate the electric motor and rotate the cutting element. The cutting element is mounted for vertical movement along its axis. A push button operable by finger pressure is provided to lower the rotating cutter into contact with the scribe film to form a dot in its surface coating. After the dot is formed, the finger pressure is released to allow the cutting element to be raised out of contact with the scribe film.

In the operation of the prior art devices, once the control switch is turned on, the drive motor operates continuously regardless of whether the push button is depressed to lower the cutting element and scribe dots in the drafting film. Under this continuous operation, the electric drive motors tend to overheat and experience undue wear. As a result, such prior art devices are characterized by significant disadvantages: (1) the electric motors tend to burn out early and unnecessarily shorten the life of the units; (2) the units tend to waste electricity; (3) the units are expensive to operate (4) the electric motors tend to overheat causing stoppage and delays. In addition, the continuously rotating cutter element presents a safety hazard and can result in a serious finger injury.

In addition, the prior art devices typically make no provision for limiting the depth of penetration of the cutting element into the scribe film. Thus, even with the most careful attention to the scribing operation, it is easily possible to penetrate too far into the underlying plastic film and cause irreparable damage. Thus, it is extremely desirable to provide a scribing instrument designed to penetrate only the surface coating on the drafting film.

Accordingly, it is a primary object of the present invention to provide a drafting instrument for scribing dots in a drafting medium which is efficient and safe to operate.

Another object of the invention is to provide an improved drafting instrument wherein the drive motor is only actuated when it is desired to scribe dots in the drafting film.

It is also an object of the invention to provide an improved drafting instrument wherein the drive motor and cutter are movable as a single unit and the drive motor is automatically actuated upon downward movement by a predetermined distance before the cutter is moved into engagement with the drafting film.

A further object of the invention is to provide an improved drafting instrument wherein the depth of penetration of the cutter into the drafting film is limited to prevent damage to the drafting film.

It is another object of the invention to provide an improved drafting instrument wherein the drive motor is automatically turned off after the scribing is completed to enhance the safety of its operation.

DISCLOSURE OF THE INVENTION

The present invention contemplates an improved drafting instrument for scribing dots on a drafting medium in which the drive motor is only actuated when it is desired to scribe the drafting medium. This objective is accomplished by providing a rotatable cutter and drive motor which are slidably mounted as a unit for vertical movement toward and away from the drafting medium under manual control and by providing a control switch for the drive motor which is responsive to downward movement of the cutter to actuate the drive motor which rotates the cutter to scribe a dot on the drafting medium. The control switch is automatically actuated upon downward movement of the cutter by a predetermined distance to turn on the drive motor. An adjustable limit is advantageously provided to control the depth of penetration of the cutter into the drafting medium. The control switch automatically turns off the drive motor when the cutter is moved upward out of engagement with the drafting medium.

In accordance with the invention, the drafting instrument comprises a rotatable cutter, drive means for rotating the cutter, means supporting the cutter for vertical movement from an upper position above the drafting medium to a lower position in contact therewith, manually operable means for moving the cutter downward into engagement with the drafting medium, and control means responsive to downward movement of the cutter for actuating the drive means to rotate the cutter and scribe a dot on the drafting medium. Preferably, limit means is provided for limiting the downward movement of the cutter to determine the depth of penetration of the cutter into the drafting medium. The limit means is adjustable to vary the depth of penetration of the cutter into the surface coating on the drafting medium to prevent damage to its underlying substrate.

In a preferred embodiment, the control means includes a microswitch TM or miniature snap switch adapted to actuate an electric drive motor to rotate the cutter before the cutter is moved into contact with the drafting medium. Preferably, the microswitch is mounted for vertical movement with the cutter and includes an actuator for controlling the on-off operation of the drive motor. In addition, the preferred embodiment includes stop means which is engageable with the microswitch actuator with the cutter in its upper position to deactuate the drive motor and disengageable from the microswitch actuator upon downward movement of the cutter by a predetermined distance to actuate the drive motor. Preferably, the stop means is adjustable to vary the amount of downward movement required to actuate the drive motor.

The preferred embodiment of the drafting instrument also includes bias means for normally urging the drive motor and cutter upwardly out of engagement with the drafting medium. A transparent cutter guard may be provided with a pair of arms spaced on opposite sides of the rotatable cutter to prevent accidental injury. An adjustable magnifying glass may also be provided to magnify the view of the rotatable cutter and drafting medium. In addition, the drafting instrument may include a rechargeable battery unit for supplying power to the drive motor.

BRIEF DESCRIPTION OF DRAWINGS

The accompanying drawings illustrate a preferred embodiment of the present invention and, together with the description, serves to explain the principles and operation of the invention.

FIG. 3 is a partially cut-away side elevation illustrating the drive motor and cutter moved downwardly into engagement with the drafting medium;

FIG. 4 is a plan view, partially cut away, of the drafting instrument of FIG. 1;

DETAILED DESCRIPTION OF PREFERRED EMBODIMENT

Figure 1:
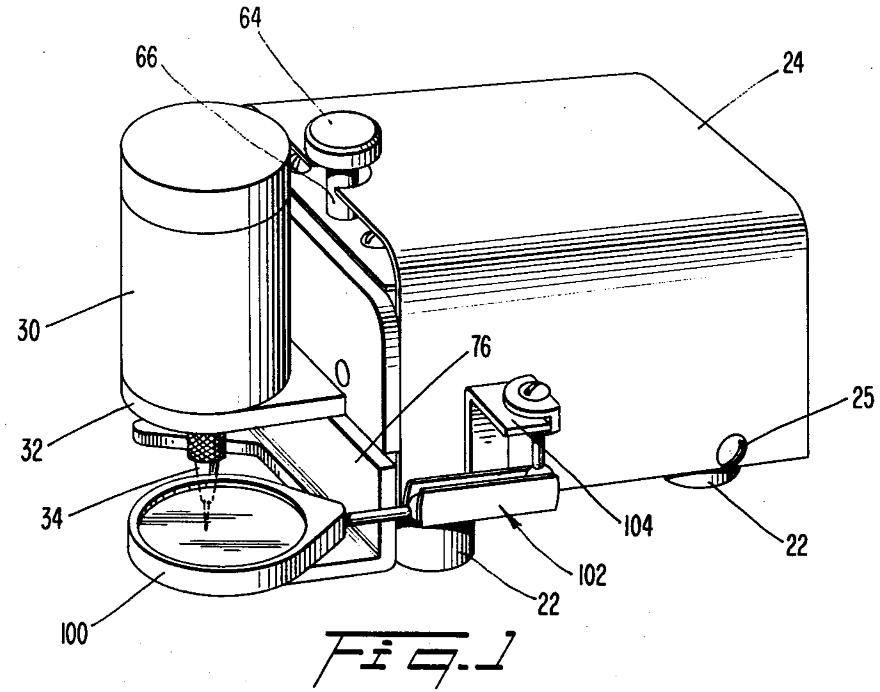
FIG. 1 is a perspective view of a drafting instrument embodying the present invention.
Figure 2:
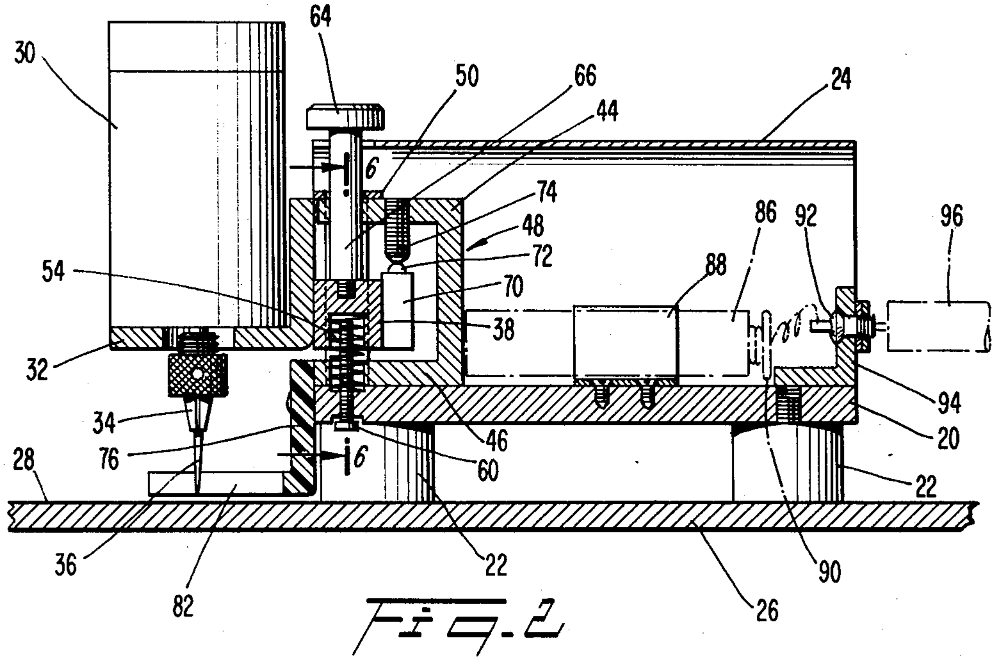
FIG. 2 is a side elevation, partially in section, illustrating the drive motor and cutter of the drafting instrument biased upwardly out of engagement with the drafting medium.
Figure 5:
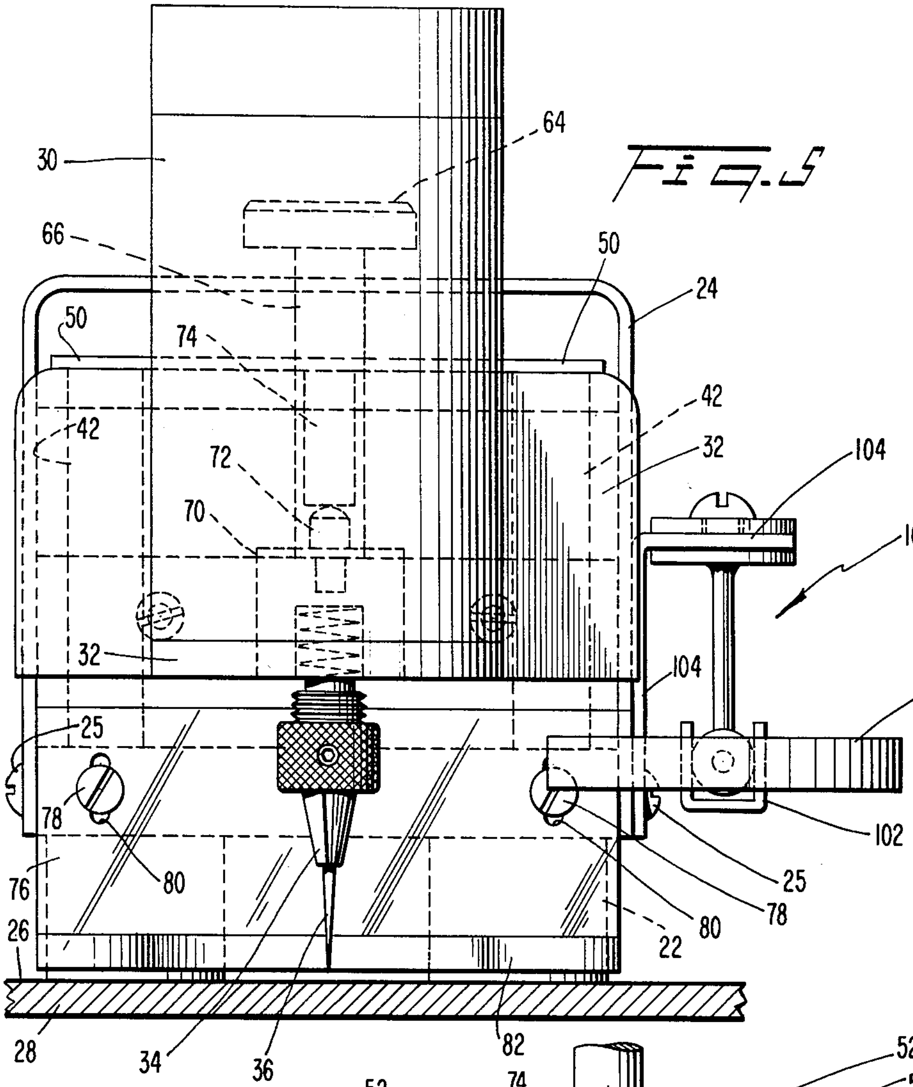
FIG. 5 is an enlarged front elevation of the drafting instrument of FIG. 1.

Referring to FIGS. 1 and 2, a drafting instrument embodying the present invention includes a base 20, preferably metal, mounted on a set of rubber or plastic bumpers 22. A four-sided cover 24 is secured by a set of screws 25 along opposite sides of base 20. The drafting instrument is used to scribe a drafting medium including an underlying substrate 26, e.g., a polyester film, provided with a thin removable surface coating 28.

A drive motor 30, preferably a high torque electric motor, is mounted on a L-shaped motor mount 32 which is vertically slidable relative to base 20 and cover 24. Drive motor 30 includes a rotatable chuck 34 for removably holding a rotary cutter 36 for rotation therewith. The tip of cutter 36 is preferably wedge-shaped in configuration. A plurality of interchangeable cutters may be provided to produce a dot size which can be varied from 0.004 to 0.060 inch in diameter.

As shown in FIG. 2, a rectangular guide block 38 is secured to the inside of motor mount 32. Guide block 38 includes a pair of vertical bores 40 (FIG. 6) adjacent to its opposite ends which slidably receive a pair of vertical guide pins 42. The guide pins are supported by suitable holes provided in upper and lower flanges 44 and 46, respectively, of a channel-shaped bracket 48 mounted at the front of base 20. A retainer plate 50 is secured to upper flange 44 by a pair of screws 52 to hold guide pins 42 in place. The guide pins serve as a guide for vertical movement of guide block 38.

Figure 6:
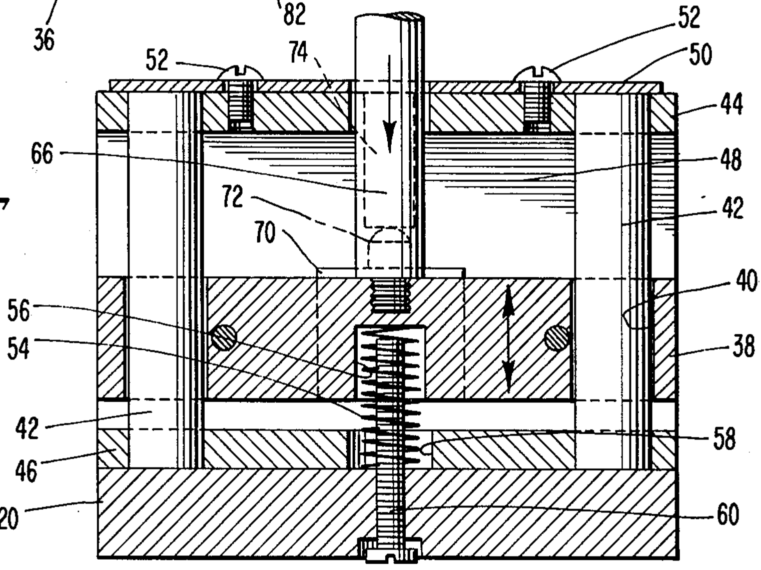
FIG. 6 is an enlarged section taken along line 6—6 of FIG. 2.

As shown in FIGS. 2 and 6, a compression spring 54 is provided between base 20 and guide block 38 to normally bias the guide block upward. Compression spring 54 is received in a central hole 56 provided in guide block 38 and extends through a bore 58 provided in lower flange 46 into engagement with base 20. The compression spring serves to normally maintain drive motor 30 and cutter 36 in a raised position above the drafting medium.

An elongated screw 60 is received in a threaded bore in base 20 in alignment with bore 58 in lower flange 46. Set screw 60 extends upward into hole 56 in guide block 38 to provide an adjustable stop which limits the downward movement of the guide block. The screw thus defines a lower cutter position where cutter 36 moves into contact with the drafting medium.

As shown in FIGS. 1 and 2, a manually operable actuator 64 extending above the top of cover 24 includes an elongated shank 66 which extends downward through upper flange 44 of bracket 48 and is threaded into the top of guide block 38. Actuator 64 responds to manual pressure to slide guide block 38 downward along guide pins 42 against the bias of compression spring 54 to move drive motor 30 downward and cutter 36 into engagement with the drafting medium.

A microswitch 70 is mounted at the rear of guide block 38 for vertical movement with drive motor 30 and cutter 36. Microswitch 70 includes a plunger-like actuator 72 which controls the on-off operation of the drive motor. With guide block 38 biased upwardly by compression spring 54, microswitch actuator 72 engages a set screw 74 threadably mounted in upper flange 44 of bracket 48 to hold microswitch 70 open and deactuate drive motor 30. When actuator 64 is depressed to move drive motor 30 and cutter 36 downward, microswitch actuator 72 is disengaged from set screw 74 upon downward movement of the drive motor and cutter by a predetermined distance at which microswitch 70 is closed to actuate the motor and rotate the cutter. Set screw 74 allows this distance to be adjusted so that drive motor 30 is actuated to rotate cutter 36 before the cutter is moved into contact with the drafting medium.

A cutter guard 76, preferably transparent plastic, is mounted at the front of base 20 by a pair of screws 78. Elongated screw receiving slots 80 are provided in cutter guard 76 to allow its height to be adjusted. The cutter guard includes a pair of legs 82 spaced on opposite sides of cutter 36 to provide protection against inadvertent injury and damage to delicate rotary cutters.

Power is supplied to drive motor 30 via microswitch 70 from a rechargeable battery 86 mounted in a battery holder 88 secured to base 20. A battery plug 90 connects the battery terminals to a phone jack 92 mounted on a bracket 94 secured at the rear of base 20. Phone jack 92 allows an adaptor unit 96 to be plugged in for recharging battery 86 from a conventional AC power supply.

The drafting instrument is provided with a magnifying glass 100 mounted on a universal bracket assembly 102 and a bracket 104 secured to base 20 and cover 24 by one of side screws 25. The universal mounting arrangement allows magnifying glass 100 to be conveniently arranged to provide a magnified view of the cutter and drafting medium. Bracket 104 is adapted to allow the magnifying glass to be mounted on either side of the drafting instrument.

To perform a dot scribing operation, the drafting instrument is rested on the drafting medium with cutter 36 positioned over the desired area where a dot is to be scribed. Magnifying glass 100 may be used to facilitate the precise location of the cutting element. Compression spring 54 normally biases drive motor 30 and cutter 36 upwardly out of engagement with the drafting medium so that microswitch actuator 72 engages set screw 74 to cut microswitch 70 off and the drive motor deactuated.

Once cutter 36 is positioned over the spot where the dot is to be scribed, actuator 64 is depressed to move drive motor 30 and cutter 36 downward. When drive motor 30 and cutter 36 move downward by a predetermined distance to disengage microswitch actuator 72 from set screw 74, microswitch 70 is closed to actuate the drive motor and rotate the cutter. Set screw 74 is preferably adjusted so that drive motor 30 and cutter 36 begin to rotate before the cutter is moved into contact with the drafting medium. The downward movement of drive motor 30 and cutter 36 continues until guide block 38 moves into contact with limit screw 60. The limit screw is adjusted to stop the downward movement of cutter 36 when it penetrates into surface coating 28 of the drafting medium. The rotation of cutter 36 then shaves away a portion of the surface coating to scribe a dot on the drafting medium. Preferably, limit screw 60 limits the penetration of cutter 36 only into surface coating 28 to prevent damage to polyester film 26.

After the dot is scribed, actuator 64 is released to allow compression spring 54 to return drive motor 30, cutter 36 and microswitch 70 to the initial upper position. As microswitch actuator 72 moves back into engagement with set screw 74, the microswitch is open to automatically shut off the drive motor. Subsequently, as indicated in FIG. 4, the drafting instrument can be moved about the drafting medium to scribe more dots at other locations, e.g., to produce a series of spaced dots.

The present invention provides an improved drafting instrument for scribing dots in a drafting medium which is efficient and safe in operation. The provision of an automatic on-off control to rotate the cutter only when necessary to scribe a dot on the drafting medium prevents damage to the drive motor from overheating. In addition, the automatic control enhances the life of the drive motor and of the batteries used to power the drive motor. The automatic cut-off of the drive motor when the scribing is completed provides enhances safety and minimizes the possibility of physical injury. The limit feature which controls the depth of penetration of the cutter serves to protect the drafting medium from damage.

The present invention is not limited to the specific details shown and described, and modifications may be made in the precision drafting instrument without departing from the principles of the invention.

We claim:

1. A precision drafting instrument for scribing small dots on a drafting medium including a substrate provided with a removable surface coating, comprising in combination:

housing means including a base and a multi-sided cover attached to said base forming an open-ended enclosure between said base and cover;

a multi-sided support means having upper and lower flanges where said lower flange is arranged on said base to mount said support means on said base within said enclosure;

a pair of guide means set spaced apart between said flanges and affixed thereto;

a multi-sided block slidably mounted on said pair of guide means for predetermined displacements between said upper and lower flanges;

a multi-legged support member having a leg affixed to said block at a first side thereof facing an open end of said housing means, and a further leg extended beyond said housing means and away therefrom;

a motor drive affixed to said extended leg of said support member;

a rotary element and a rotatable chuck removably holding said element attached at an end thereof to said motor drive and disposed to rotate about an axis aligned parallel to the direction of said block displacements, said element having a cutting portion at an end thereof opposite said attached end;

motor switch means affixed to a further side of said block opposite said first side thereof and having a control part disposed thereby facing said upper flange of said support means in position to contact an actuator therefor adjustably set in said upper flange;

a manually operable driver slidably maintained in said upper flange of said support means, said driver having an extended part thereof projecting through an opening medially situated in said housing cover, and an oppositely extended part thereof affixed to a still further side of said block;

a compression spring maintained in operable position axially aligned with said driver parts by having one end received within said block at a still further side thereof and an opposite end received within said lower flange of said support means;

a stop means adjustably set in said base and projecting through said spring in position to engage said block within said still further side thereof;

whereby said spring expanded holds said driver passively disposed with said cutting portion spaced from said drafting medium, and said switch means control part and said actuator therefor engaged to maintain said switch means open and thereby said motor drive inactive, wherefore said cutting portion is at rest in an ineffective disposition, and operation of said driver displacing said block on said guide means an initial extent disengages said control part from said actuator therefore to close said switch means and activate said motor drive, and a second extent brings said cutting portion in contact with said surface coating of said drafting medium wherefore rotation of said cutting portion removes surface coating to a depth set by adjustment of said stop means to predetermine displacement of said block against the compression of said spring.

2. The drafting instrument of claim 1 which includes a transparent guard mounted on said housing means, and said guard having a pair of arms spaced on opposite sides of said rotary element in proximity to said cutting portion thereof.

3. The drafting instrument of claim 1 which includes a magnifying sighting device adjustably mounted on said housing to provide a magnified view of said cutting portion and drafting medium.

4. The drafting instrument of claim 1 which includes a power source battery mounted on said base within said housing for energizing said drive motor.

* * * * *